Patented June 24, 1930

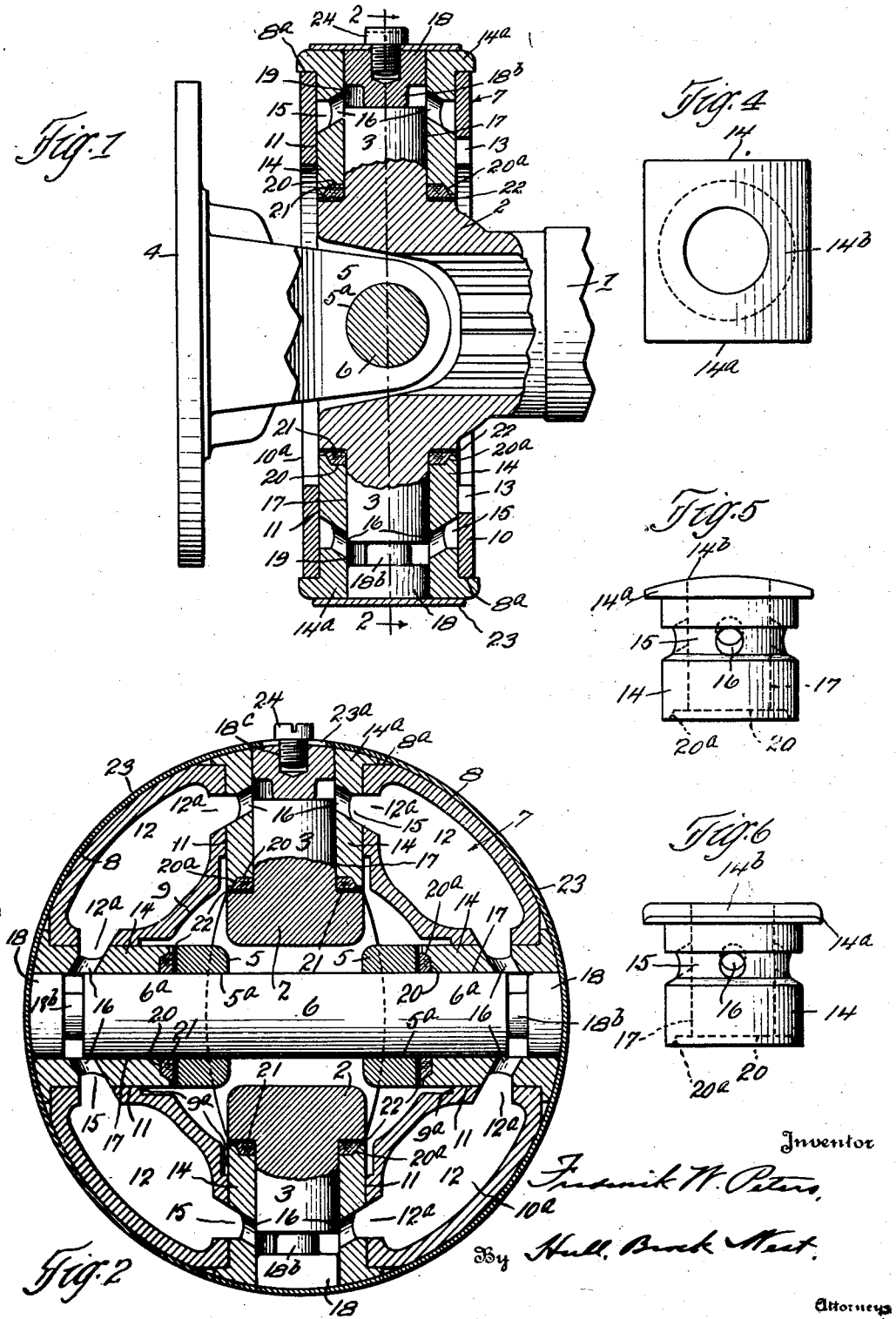

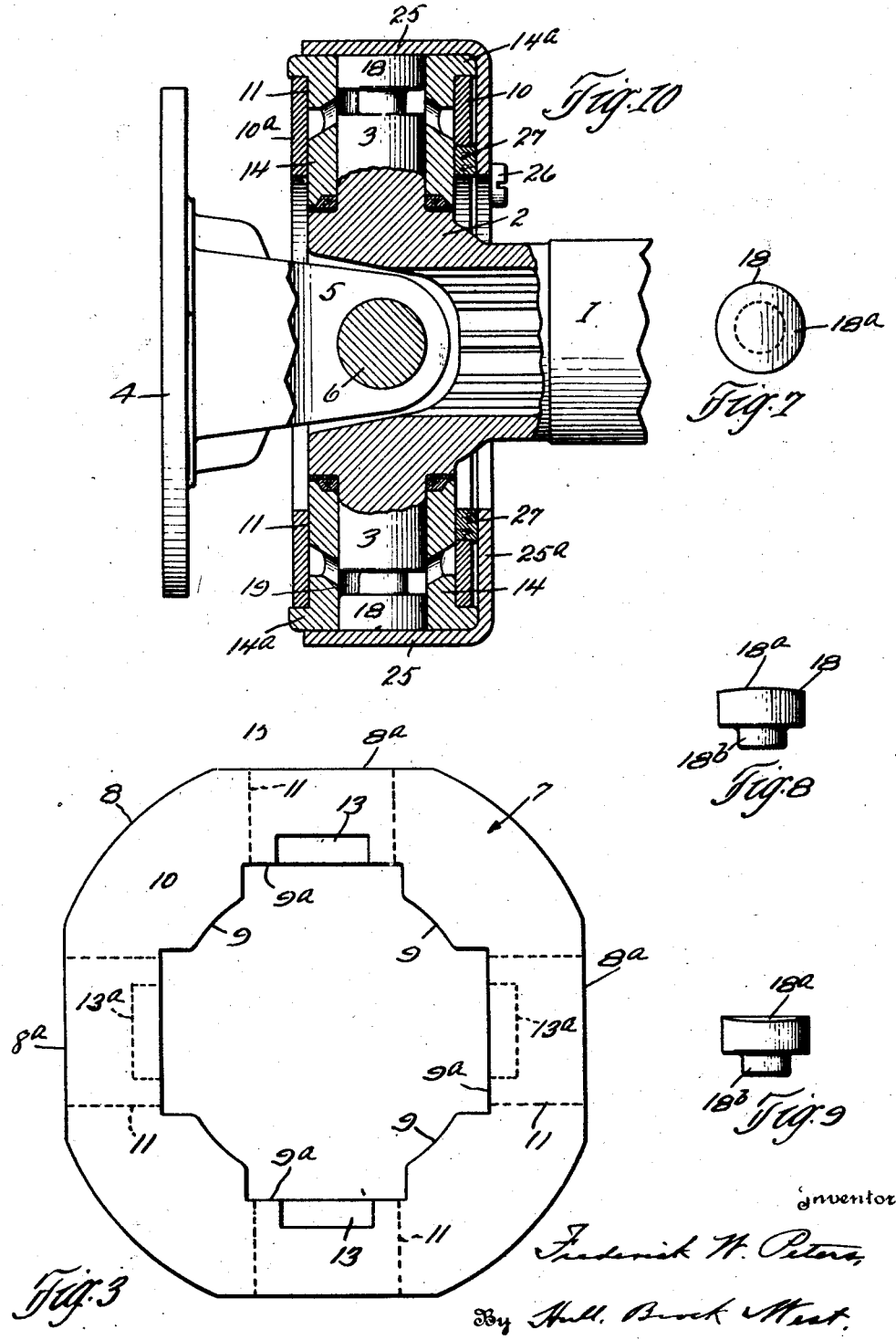

1,767,551

UNITED STATES PATENT OFFICE

FREDERICK W. PETERS, OF CLEVELAND, OHIO, ASSIGNOR TO THE ALMETAL UNIVERSAL JOINT COMPANY, OF CLEVELAND, OHIO, A CORPORATION OF OHIO

UNIVERSAL JOINT

Application filed July 14, 1927. Serial No. 205,602.

This invention relates to universal joints, and more particularly to joints of the type wherein a hollow lubricant-containing connecting ring is employed as a means for coupling trunnions carried by driving and driven members.

It is the general object and purpose of the invention to provide a joint of this character which will permit of the convenient assembling and disassembling of the trunnions and ring; to provide a joint of this character with a novel construction and arrangement of bushings which will not only facilitate the assembling and disassembling operation, but which will enable lubricant to be supplied from the ring in an efficient manner to the trunnions while preventing the leakage of lubricant about the trunnions. Further and more limited objects of the invention will appear hereinafter and will be realized in and through the combinations of elements and parts included in the claims hereof.

Referring to the drawings Fig. 1 represents a central sectional view through a joint constructed in accordance with my invention, certain parts being shown in elevation; Fig. 2 a sectional view corresponding substantially to the line 2—2 of Fig. 1; Fig. 3 a side elevation of the connecting ring; Fig. 4 a plan view of one of the bushings; Figs. 5 and 6 elevations, taken at right angles to each other, of one of said bushings; Fig. 7 a plan view of one of the end thrust blocks; Figs. 8 and 9 side elevations, taken at right angles to each other, of one of said end thrust blocks; and Fig. 10 a view, similar to Fig. 1, showing a modified form of the invention.

Describing the parts by reference characters and in connection with Figs. 1–9, inclusive, 1 represents the hub of one of the members to be connected, the same being provided with a yoke 2 having integral trunnions 3. 4 denotes a flange on the other member and 5 short yoke arms carried by said flange and provided each with a bore $5^a$ for the reception of a cross pin 6, the ends $6^a$ whereof constitute trunnions. The connecting ring for the trunnions (indicated generally at 7), is provided with the outer cylindrical surfaces 8 and the corresponding inner cylindrical surfaces 9. Between adjacent outer cylindrical surfaces, the ring is flattened, as shown at $8^a$, and between adjacent inner cylindrical surfaces 9, the ring is provided with outwardly projecting recesses, each having a flattened surface $9^a$. The centers of the surfaces $8^a$ are arranged 90° apart and the same is true of the surfaces $9^a$. The ring is provided with opposite sides 10 and $10^a$.

From each of the surfaces $8^a$, a radial bore 11 extends inwardly through the corresponding inner face $9^a$ of the ring. Between adjacent bores, the ring is provided with chambers 12 for lubricant, each chamber being provided with ports $12^a$ at the opposite ends thereof, communicating with the bores 11.

It will be noted, from an inspection of Figs. 1, 2 and 3, that the side 10 of the ring is provided with outwardly extending notches 13 and at the side $10^a$ is also provided with outwardly extending notches $13^a$, the notches constituting radial outward extensions of the corresponding sides of the recesses $9^a$, the notches intersecting the bores 11 and the centers of the notches 13 being located 90° from the centers of the notches $13^a$. The notches 13 and $13^a$ are of sufficient width to permit the passage therethrough of the trunnions 3 and $6^a$, thereby facilitating the assembling of the trunnions in their cooperating bores 11.

In each bore is mounted a bushing 14, each such bushing having a head $14^a$. As will be observed by reference to Figs. 1 and 2 and 4 to 6, inclusive, the head of each bushing is provided with an outer cylindrical surface $14^b$ having the same curvature as the cylindrical surface 8 whereby, when the said bushings are properly positioned within their respective bores 11, their outer surfaces constitute each a continuation of the cylindrical surfaces 8. Each head rests upon the flattened seat $8^a$ provided therefor and is preferably of a width to extend beyond the sides 10 and $10^a$ of the ring, thereby enabling the head to be grasped by an appropriate tool for purposes of disassembling. Each bushing is provided with a groove 15 extending therearound and forming an annular distributing chamber with the interior of the bore 11, there being ports 16 extending through the grooved portion of the bushing and preferably converging toward the centers of the outer portions of their respective bores 17, at the angle indicated, the inner ends of the ports communicating with the chamber provided within the outer portion of the bore 17 of the bushing, four such ports being shown.

The bores 17 are of a size to receive snugly therewithin their respective trunnions, and the grooves 15 and ports 16 are so arranged that the lubricant within the chamber 12 will be delivered by centrifugal action through the ports and the chambers provided beyond the ends of the said trunnions.

Within the outer end of the bore of each bushing is mounted a thrust block, each having a head 18 fitting the outer portion of the bore of its bushing and each head having a cylindrical outer surface 18$^a$ adapted to form a continuation of the cylindrical surfaces 14$^a$ of the head of the bushing within which it is inserted. Each thrust block is provided with a stem 18$^b$ adapted to engage the outer end of the cooperating trunnion, the annular space about the stem providing a chamber 19 communicating with the ports 16 to permit the circulation of lubricant from the adjacent chambers 12 beyond the end of the trunnion with which the thrust block cooperates.

Each bushing extends through a wall 9$^a$ and is provided at its inner end with an annular recess, the bottom wall 20 of which surrounds the trunnion in its bore, each recess having a tapered side wall 20$^a$. Within the recess formed by the walls 20, 20$^a$ there is inserted compressible packing material, indicated at 21, and between such packing materal and the adjacent faces 2$^a$, 5$^b$ of the yoke arms 2 and 5 respectively, is interposed a washer 22, which washer is preferably of the spring type shown in my Patent No. 1,621,216, granted March 15, 1927. It will be evident that, by forcing the bushings home in their respective seats, the packing material will be compressed within the annular recesses formed at the inner ends of the bushings and that the shape of these recesses will cause the packing material to be compressed about the trunnions extending therethrough, thereby preventing leakage of lubricant.

In order to secure the bushings and trunnions in place, I apply a band 23, preferably of sheet steel, to the exterior surface of the ring 7, the band being of a diameter to fit snugly the surfaces 8, 14$^a$ and 18$^a$, anchoring the ring in place by means of a screw plug 24 inserted through a slot 23$^a$ in said band and threaded into a socket 18$^c$ in one of the thrust blocks.

The trunnions 3 of the member 1 may be inserted in the bores 11 through the appropriate notches 13, by merely tilting the ring so as to enable one trunnion to be inserted in its bore, after which the ring may be shifted and adjusted so that the other trunnion may enter its bore, after which the bushings 14 will be inserted in said bores.

In Fig. 10 I show a modification of my invention wherein all of the parts may be identical with those described in connection with Figs. 1–9, inclusive, with the exception that, instead of using a cylindrical band, applied only to the exterior of the ring 7, as a means for securing the thrust blocks and trunnions in place, I employ an angular or flanged ring and omit the plug 24 and socket 18$^c$. The parts designated by the numerals 1–22 in connection with Figs. 1–9 inclusive are also employed in Fig. 10, and the parts so employed in Fig. 10 are designated by the same numerals as appear in Figs. 1–9. The angular or flanged ring referred to comprises a cylindrical wall 25 which is adapted to extend about and to fit the exterior of the ring and the cylindrical surfaces of the bushings and their thrust blocks. From this cylindrical wall there projects, at right angles, the flange 25$^a$, which is fastened to the ring by a suitable number of screw bolts, one of which is indicated at 26.

In both forms of my invention, one set of trunnions is constituted by the ends of the cross pins 6. If desired, this pin need not be assembled together with the short yokes 5, but these yokes may be inserted in place and the bushings and pins then applied, thereby making it unnecessary to employ the notches 9$^a$ in the side 10$^a$ of the ring. When these notches are omitted, as may be done, the danger of leakage through the notches 9$^a$ formed in the side 10 of the ring may be obviated by placing packing material 27 in each such notch in position to be engaged by the flange 25$^a$ so that, when the screw bolts 26 are set up, the packing material will be compressed against the walls of the notches and against the adjacent portions of the bushings.

Having thus described my invention, what I claim is:—

1. In a universal joint, the combination of a driving and a driven member each provided with trunnions, a hollow lubricant-containing ring provided with quarteringly spaced radial bores extending therethrough, each bore having a port communicating with the interior of said ring, a bushing for each bore and adapted to receive a trunnion in its own bore, each bushing being provided with a port adapted to communicate with a port in the bore in which it is mounted, a thrust block in the outer end of the bore of each bushing, each block having a reduced stem arranged to engage the end of the trunnion in the bore of such bushing, the said stem and head providing a chamber beyond the end of such trunnion, which chamber communicates with the port or ports in said bushing, and a band mounted on the exterior of said ring and engaging the outer ends of the bushings and the thrust blocks therein.

2. In a universal joint, the combination of a driving and a driven member, one of said members having integral trunnions and the other being provided with a yoke and a pin arranged to be carried by the said yoke with the ends of the pin constituting trunnions, a hollow lubricant-containing ring provided with quarteringly spaced radial bores extending therethrough each having a port communicating with the interior of said ring, a bushing for each bore and adapted to receive a trunnion in its own bore, each bushing being provided with a port adapted to communicate with the ports in the bore in which it is mounted, a thrust block in the outer end of the bore of each trunnion, each block having a reduced stem arranged to engage the end of the trunnion in the bore of such bushing, the said stem and head providing a chamber in such bushing beyond the end of such trunnion which chamber communicates with the port in said bushing, one side of the ring being provided with recesses extending outwardly from the interior of the ring and intersecting diametrically opposed bores in said ring, the outer ends of the recesses terminating short of the ports in the bushings mounted in said bores, packing material in said recesses, a band adapted to engage the outer ends of the bushings and of the thrust blocks therein and provided with a radially extending flange adapted to engage such packing, and means engaging said flange for securing the same to said ring and for compressing the said packing.

3. In a universal joint, the combination of a driving and a driven member, one of said members having integral trunnions and the other being provided with a yoke and a pin arranged to be carried by the said yoke with the ends of the pin constituting trunnions, a ring provided with quarteringly spaced radial bores extending therethrough, a bushing for each bore and adapted to receive a trunnion in its own bore, a thrust block in the outer end of the bore of each bushing, one side of the ring being provided with recesses extending outwardly from the interior of the ring and intersecting diametrically opposed bores in said ring, and a band having a cylindrical portion adapted to engage the outer ends of the bushings and of the thrust blocks therein and being provided with a radially extending flange, means engaging said flange for securing the same to said ring, and packing material in said recesses arranged to be engaged by the said flange.

4. In a universal joint, the combination of a driving and a driven member, each having trunnions, a ring having cylindrical outer surfaces and quarteringly spaced radial bores extending therethrough between said surfaces, a bushing mounted in each bore and receiving a trunnion within its own bore, each bushing having a head the outer surface of which is curved to constitute a continuation of the outer cylindrical surfaces of the ring, a thrust block mounted in the outer end of each bushing bore and adapted to engage the end of the trunnion therewithin, each such block having an outer cylindrical surface adapted to constitute a central extension of the cylindrical surface of the bushing in which it is placed, and a band mounted on the exterior of the said ring and engaging the outer cylindrical surfaces of the bushing heads and of the thrust blocks.

In testimony whereof, I hereunto affix my signature.

FREDERICK W. PETERS.